(12) United States Patent
Flack et al.

(10) Patent No.: US 12,484,871 B2
(45) Date of Patent: Dec. 2, 2025

(54) SYSTEM FOR AND METHOD OF IDENTIFYING CORONARY ARTERY DISEASE

(71) Applicant: Artrya Limited, Perth (AU)

(72) Inventors: Julien Charles Flack, Swanbourne (AU); Jack Rex Joyner, Floreat (AU); Casey Jack Clifton, Subiaco (AU); Abdul Rahman Ihdayhid, Ardross (AU); Girish Dwivedi, Dalkeith (AU)

(73) Assignee: Artrya Limited, Perth (AU)

( * ) Notice: Subject to any disclaimer, the term of this patent is extended or adjusted under 35 U.S.C. 154(b) by 292 days.

(21) Appl. No.: 18/491,366

(22) Filed: Oct. 20, 2023

(65) Prior Publication Data
US 2024/0130702 A1 Apr. 25, 2024
US 2024/0225578 A9 Jul. 11, 2024

Related U.S. Application Data

(63) Continuation of application No. PCT/AU2022/050365, filed on Apr. 21, 2022.

(30) Foreign Application Priority Data

Apr. 21, 2021 (AU) .................. 2021901188

(51) Int. Cl.
*A61B 6/50* (2024.01)
*A61B 6/03* (2006.01)
(Continued)

(52) U.S. Cl.
CPC .............. *A61B 6/504* (2013.01); *A61B 6/032* (2013.01); *A61B 6/503* (2013.01); *G06T 7/0012* (2013.01);
(Continued)

(58) Field of Classification Search
CPC ......... A61B 6/504; A61B 6/032; A61B 6/503; A61B 6/468; A61B 6/463; A61B 6/481;
(Continued)

(56) References Cited

U.S. PATENT DOCUMENTS 7,209,578 B2   4/2007   Saito
8,761,474 B2   6/2014   Yu
(Continued)

FOREIGN PATENT DOCUMENTS

WO   2012083350   6/2012
WO   2021038203   3/2021
WO   2021249439   12/2021

OTHER PUBLICATIONS

Daniel Rinck et al, "Shape-based segmentation and visualization techniques for evaluation of atherosclerotic plaques in coronary artery disease", Proceedings of SPIE, Visual Communications and Image Processing 2005, vol. 6141, published Mar. 2, 2006, pp. 61410G-61410G-9, Beijing, China.
(Continued)

*Primary Examiner* — Siamak Harandi
(74) *Attorney, Agent, or Firm* — Heslin Rothenberg Farley & Mesiti P.C.

(57) ABSTRACT

A method and corresponding system of identifying coronary artery disease. The method comprises receiving contrast cardiac CT data indicative of a contrast cardiac CT scan carried out on a patient, and analysing the contrast cardiac CT data using machine learning to identify a plurality of seed points in the contrast cardiac CT data expected to correspond to locations in cardiac arteries of the patient. The method also comprises producing data indicative of transverse image slices of the cardiac arteries of the patient using the contrast cardiac CT data and the identified seed points, analysing the transverse image slice data using machine learning to produce inner artery wall data and outer artery
(Continued)

wall data indicative of predicted respective inner and outer walls of the coronary arteries of the patient, and identifying presence of coronary artery disease using the predicted inner and/or outer walls of the coronary arteries of the patient.

21 Claims, 10 Drawing Sheets

(51) Int. Cl.
    *G06N 20/20*     (2019.01)
    *G06T 7/00*     (2017.01)
    *G06V 10/26*     (2022.01)

(52) U.S. Cl.
    CPC ............... *G06T 2207/10081* (2013.01); *G06T 2207/20081* (2013.01); *G06T 2207/20092* (2013.01); *G06T 2207/30048* (2013.01); *G06T 2207/30101* (2013.01); *G06T 2207/30172* (2013.01)

(58) Field of Classification Search
    CPC ............... A61B 6/5217; A61B 8/4483; A61B 2576/023; A61B 6/03; G06T 7/0012; G06T 2207/10081; G06T 2207/20081; G06T 2207/20092; G06T 2207/30048; G06T 2207/30101; G06T 2207/30172; G06T 2207/20084; G06T 2207/20156; G06T 7/11; G06T 7/187; G06T 2207/30104; G06T 7/10; G06N 3/0464; G06N 3/09; G06N 20/20; G06N 3/02; G06N 20/00; G06V 10/26; G06V 2201/03; G16H 30/20; G16H 50/20; G16H 50/30; G16H 30/40

See application file for complete search history.

(56) References Cited

U.S. PATENT DOCUMENTS

| | | | |
|---|---|---|---|
| 8,768,669 | B1 | 7/2014 | Hart |
| 9,589,204 | B2 | 3/2017 | Gremse |
| 10,083,504 | B2 | 9/2018 | Bronkalla |
| 10,580,131 | B2 | 3/2020 | Mazo |
| 10,600,184 | B2 | 3/2020 | Golden |
| 10,957,454 | B2 | 3/2021 | Li |
| 11,227,389 | B2 | 1/2022 | Song |
| 2012/0243764 | A1 | 9/2012 | Dey |
| 2019/0172211 | A1 | 6/2019 | Novikov et al. |
| 2019/0244347 | A1 | 8/2019 | Buckler et al. |
| 2019/0318476 | A1 | 10/2019 | Isgum et al. |
| 2020/0069197 | A1 | 3/2020 | Samarage et al. |
| 2020/0193603 | A1 | 6/2020 | Golden et al. |
| 2020/0202557 | A1 | 6/2020 | Schmidt |
| 2020/0222018 | A1* | 7/2020 | van Walsum ........ A61B 6/5264 |
| 2021/0057081 | A1 | 2/2021 | Mohr et al. |
| 2021/0074435 | A1 | 3/2021 | Taylor et al. |
| 2021/0125337 | A1 | 4/2021 | Wilson et al. |
| 2022/0067935 | A1 | 3/2022 | Song et al. |
| 2022/0284583 | A1 | 9/2022 | Lee et al. |

OTHER PUBLICATIONS

Athanasiou Lambros et al, "Three-dimensional reconstruction of coronary arteries and plaque morphology using CT angiography—comparison and registration using IVUS", 2015 37th Annual International Conference of the IEEE Engineering in Medicine and Biology Society (EMBC), published Aug. 25, 2015, pp. 5638-5641.

Bhargav Raman et al, "Automated tracing of the adventitial contour of aortoiliac and peripheral arterial walls in CT aniography (CTA) to allow calculation of non-calcified plaque burden", Journal of Digital Imaging; the Journal of the Society for Computer Applications in Radiology, Springer-Verlag, NE, vol. 24, No. 6, published Mar. 10, 2011, pp. 1078-1086.

Vukadinovic D et al, "Segmentation of the 1-18 outer vessel wall of the common carotid artery in CTA", IEEE Transactions on Medical Imaging, vol. 29, No. 1, published Jan. 1, 2010, pp. 65-76.

Extended European Search Report (EESR) for European Appl. No. EP22790611.2, European Patent Office, 80298, Munich Germany, dated Aug. 21, 2024, 7 pages.

Wolterink, Jelmer M., et al. "Coronary artery centerline extraction in cardiac CT angiography using a CNN-based orientation classifier." Medical image analysis 51 (2019): pp. 46-60.

* cited by examiner

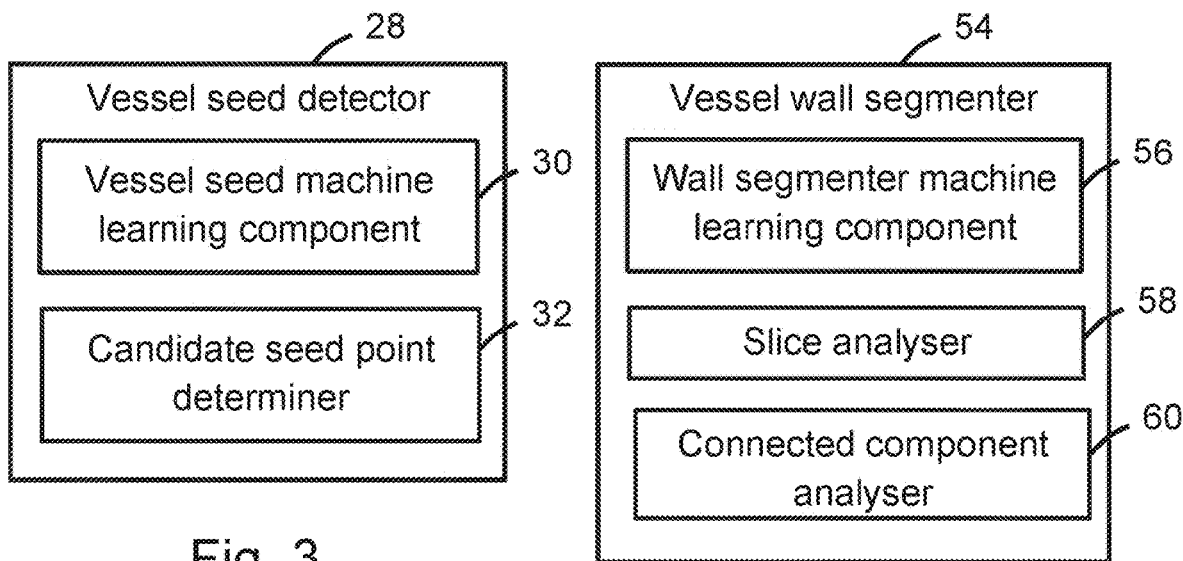
Fig. 3
Fig. 5
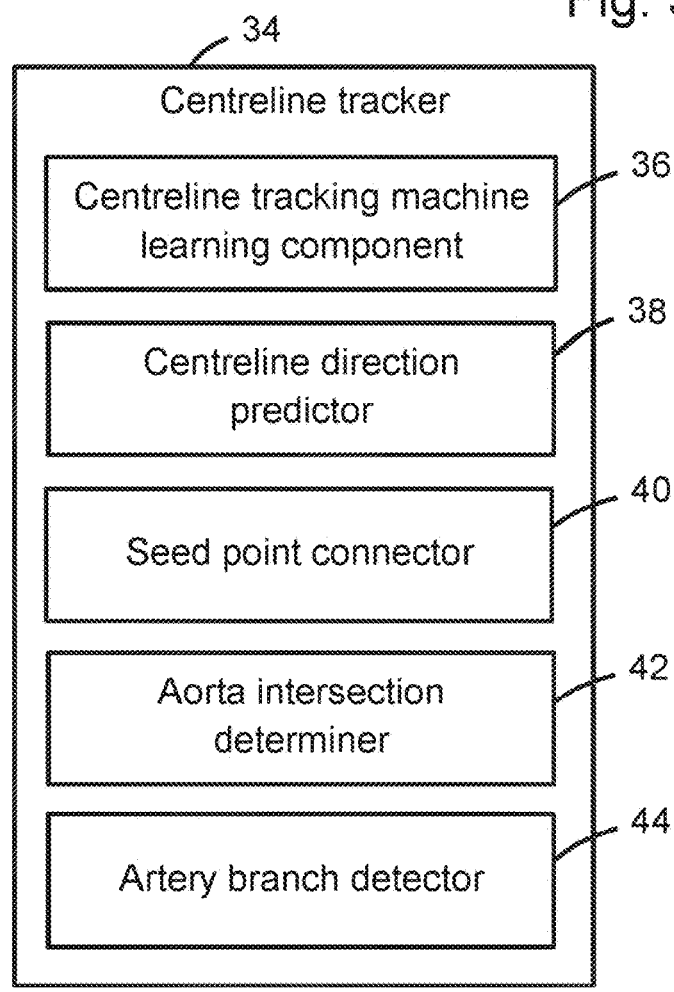
Fig. 4

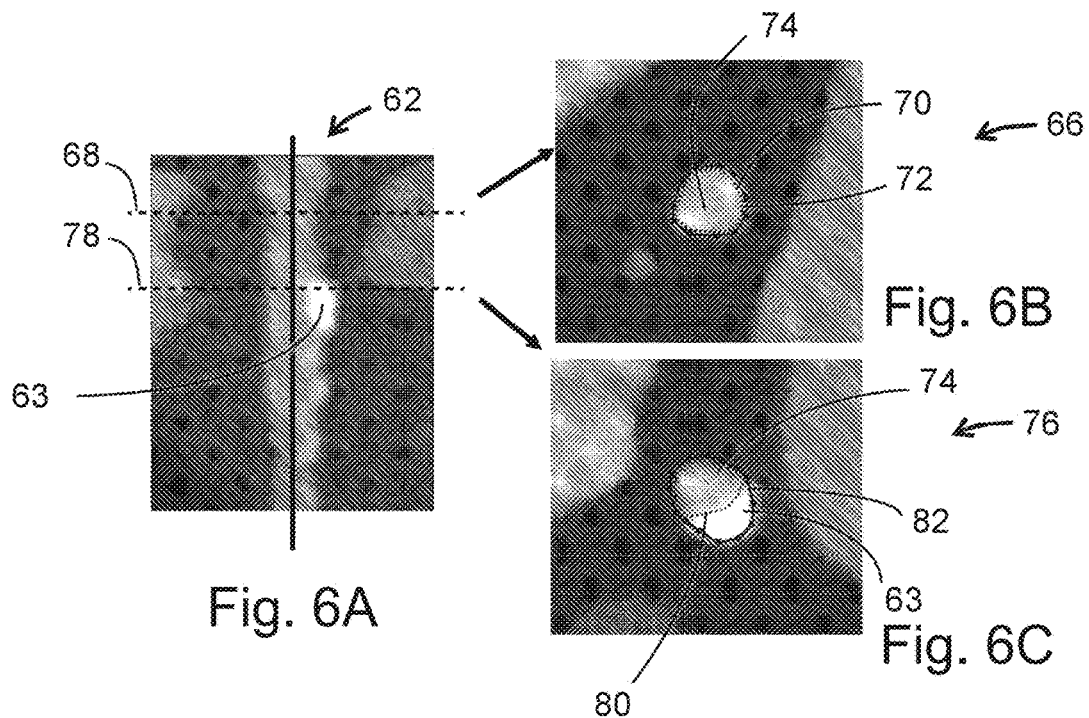
Fig. 6A
Fig. 6B
Fig. 6C
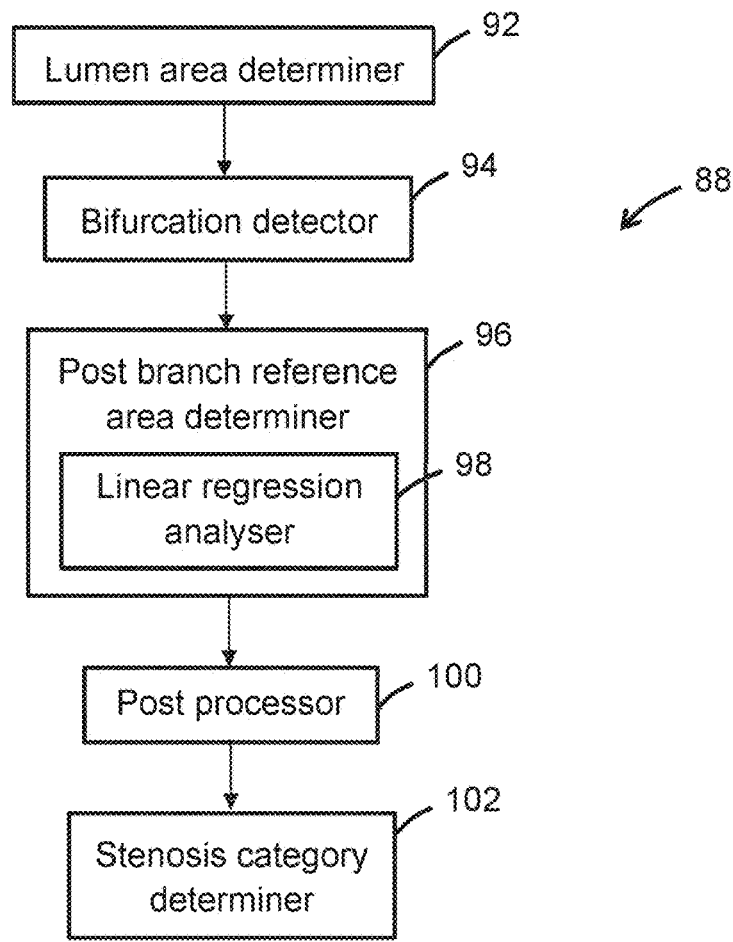
Fig. 7

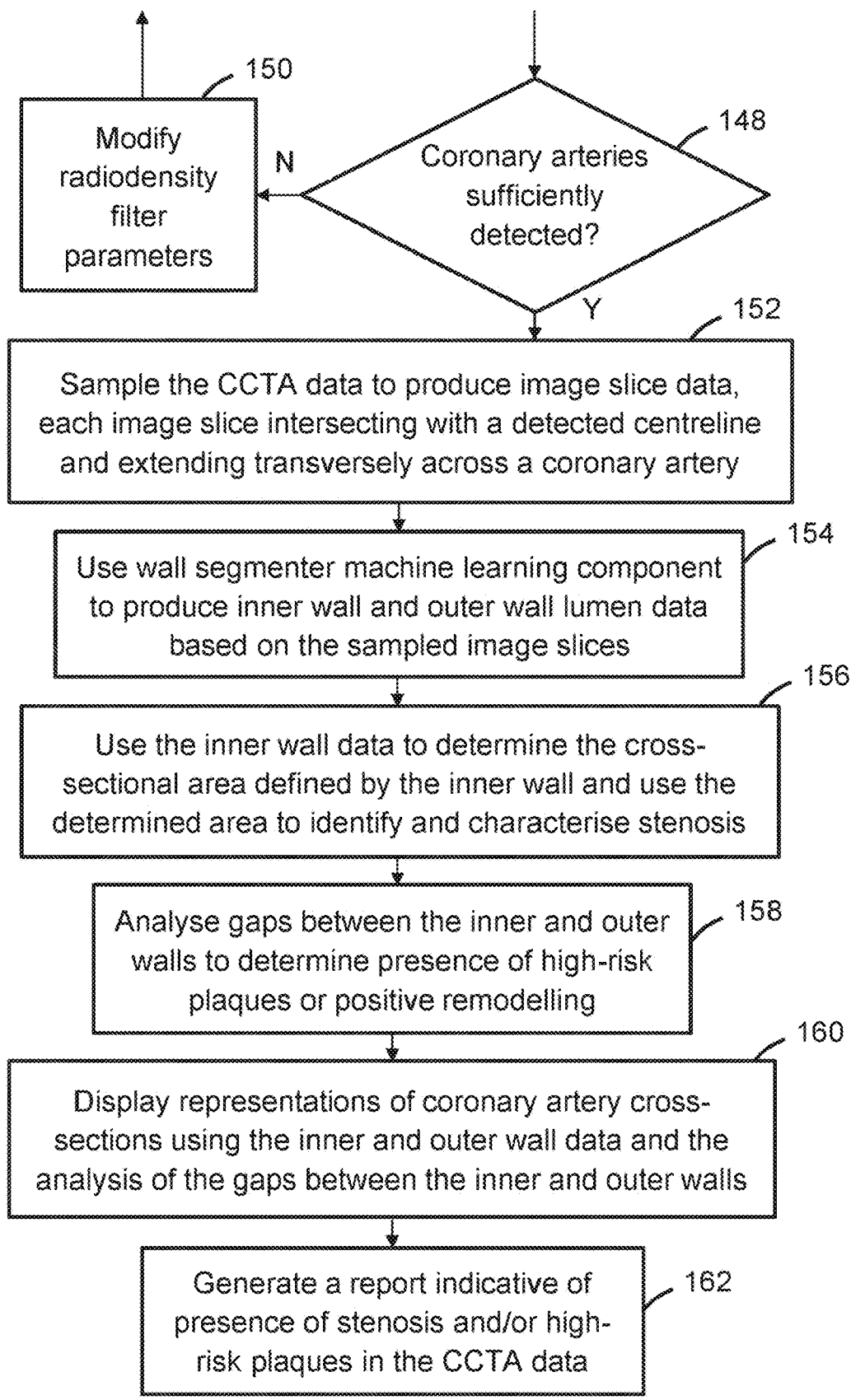
Fig. 9 - continued

SYSTEM FOR AND METHOD OF IDENTIFYING CORONARY ARTERY DISEASE

CROSS REFERENCE TO RELATED APPLICATIONS

This application is a by-pass continuation of PCT International Application No. PCT/AU2022/050365, filed on Apr. 21, 2022, and published on Oct. 27, 2022 as WO 2022/221921, which claims priority to Australian Application No. AU 2021901188, filed on Apr. 21, 2021, the contents thereof being hereby incorporated herein by reference in their entireties.

FIELD OF THE INVENTION

The present invention relates to a system for and method of identifying coronary artery disease and to a system and method that also characterises identified coronary artery disease.

BACKGROUND OF THE INVENTION

Atherosclerosis is a disease of the coronary arteries wherein atheromatous plaque ("plaque") accumulates abnormally in the inner layer of an arterial wall. Significant accumulation of plaque can cause a narrowing of an artery, referred to as arterial stenosis, and consequently a reduction of blood flow. Significant arterial stenosis in the context of coronary arteries can result in heart attack and death.

A known system for identifying coronary artery disease involves determining a predicted radius from an artery centreline to an artery inner wall, and using the determination to identify disease. However, this technique has limitations in that limited information is provided in relation to disease.

SUMMARY OF THE INVENTION

In accordance with a first aspect of the present invention, there is provided a method of identifying coronary artery disease comprising:
  receiving contrast cardiac CT data indicative of a contrast cardiac CT scan carried out on a patient;
  analysing the contrast cardiac CT data using machine learning to identify a plurality of centreline seed points in the contrast cardiac CT data predicted to correspond to locations on centrelines of the cardiac arteries of the patient by:
    analysing the contrast cardiac CT data using machine learning to identify a plurality of predicted centreline seed points; and
    determining a plurality of centreline seed points corresponding to predicted locations on centrelines of the coronary arteries using machine learning by predicting from an instant determined centreline seed point a probable direction to a further centreline seed point of the coronary artery, and selecting a predicted centreline seed point from the plurality of predicted centreline seed points using the predicted probable direction to a further centreline seed point of the coronary artery;
  producing data indicative of transverse image slices of the cardiac arteries of the patient using the contrast cardiac CT data and the identified centreline seed points;
  analysing the transverse image slice data using machine learning to produce inner artery wall data and outer artery wall data indicative of predicted respective inner and outer walls of the coronary arteries of the patient; and
  identifying presence of coronary artery disease using the predicted inner and/or outer walls of the coronary arteries of the patient.

In an embodiment, the step of identifying a plurality of predicted centreline seed points comprises applying a radiodensity test so as to pass predicted centreline seed points that have an associated radiodensity value within a defined parameter range.

In an embodiment, the radiodensity test is a Hounsfield Unit test and the defined parameter range is a Hounsfield Unit value between 100 and 600.

In an embodiment, the step of predicting a probable direction to a further centreline seed point is carried out using the predicted centreline seed points and data cubes.

In an embodiment, the step of predicting a probable direction to a further centreline seed point from an instant centreline seed point comprises starting with a centreline seed point at or adjacent a predicted end of a coronary artery remote from the aorta and successively predicting centreline seed points from the remote end to the aorta.

In an embodiment, the method comprises using machine learning to detect intersection locations between coronary arteries and the aorta, for example by carrying out an aorta segmentation process on the contrast cardiac CT data using machine learning to predict the location of the ascending aorta in the contrast cardiac CT data, and using the predicted ascending aorta location and the identified lines representative of the coronary arteries. The method may comprise determining whether a coronary artery connects to the aorta based on whether the coronary artery extends to a position within a defined distance, such as 4 mm, from the ascending aorta.

In an embodiment, the method comprises using a branch detection algorithm to detect branches on the primary coronary arteries that were not initially identified as viable centrelines.

In an embodiment, the method comprises a representative artery line labeller that associates labels with identified arteries, the labels identified using machine learning that may comprise at least one classifier. The at least one classifier may include an adaptive boosting (AdaBoost) algorithm to boost performance of the classifier.

In an embodiment, the at least one classifier may be arranged to classify a coronary artery based on a plurality of key coronary artery features. The key coronary artery features may include a location of an end of the coronary artery remote from the aorta, and direction vectors indicative of a plurality of different locations along the coronary artery. The plurality of different locations may be disposed at a proximal location adjacent the aorta, at a location substantially mid vessel, and at a location at or adjacent an end of the coronary artery remote from the aorta.

In an embodiment, the method comprises modifying the parameter range used by the radiodensity test if a determination is made that the identified coronary arteries are incorrect or incomplete. If the determination is that insufficient coronary arteries have been identified, the method may comprise widening the parameter range such that the number of candidate seed points increases.

In an embodiment, the transverse image slice is a slice taken perpendicular to the coronary artery.

In an embodiment, the step of analysing the transverse image slice data using machine learning to produce inner artery wall data and outer artery wall data comprises training the machine learning component using ground truth data indicative of example transverse image slices that include inner and outer artery walls and imaging artefacts indicative of coronary artery disease.

In an embodiment, the ground truth data includes multiple cross sectional image data slices for each of a set of multiple defined points along a ground truth coronary artery, the image slices including at least one image data slice before the defined point and at least one image data slice after the defined point.

In an embodiment, the method comprises using the determined inner wall data to determine a cross-sectional lumen area, and to use the determined cross-sectional lumen area to identify stenosis.

In an embodiment, the method comprises determining a reference cross sectional area after each artery bifurcation, the reference area calculated by fitting a linear regression line to an artery portion after the artery bifurcation, the linear regression line indicative of a linear progressively reducing reference cross sectional area, and identifying stenosis based on a comparison of a determined cross-sectional area with a reference cross sectional area according to the linear regression line.

In an embodiment, the method comprises identifying stenosis if the comparison of the determined cross-sectional area with the reference cross sectional area is indicative of a defined proportional difference.

In an embodiment, the step of identifying presence of coronary artery disease comprises determining a gap region between the determined inner and outer wall data and analysing characteristics of the gap region in order to characterise the coronary artery disease.

The characteristics of the gap region may include the radiodensity of voxels associated with the gap region.

In an embodiment, the step of identifying presence of coronary artery disease comprises identifying high risk plaque that may include low attenuation plaque and/or spotty calcification.

The method may comprise identifying a spotty calcification by applying a radiodensity test to identify candidate voxels in the gap that are predicted to be associated with calcified plaques, and applying a connected component analyser to associate related voxels together as calcified volumes. The step of identifying a spotty calcification may further include applying a size test to each identified calcified volume such that a calcified volume is identified as a spotty calcification if the calcified volume has a diameter less than a defined amount, such as 3 mm.

In an embodiment, the step of identifying presence of coronary artery disease comprises identifying positive remodelling based on whether a radial dimension and/or cross-sectional area and/or volume of the gap is greater than a defined amount, or proportion compared to a normal coronary artery, such as 10% greater than a normal vessel gap.

In an embodiment, the method comprises storing different resolution versions of received contrast cardiac CT data and/or facilitating conversion of received contrast cardiac CT data to lower resolutions so that coronary artery disease analysis can be carried out on a selected resolution version, the contrast cardiac CT data resolution selected based on desired accuracy and analysis speed.

In an embodiment, the method comprises enabling a user to edit the inner artery wall data.

In an embodiment, the method comprises enabling a user to edit the inner artery wall data by facilitating manual modification of a displayed inner artery wall using an interface screen, for example by displaying a plurality of control points representative of the artery inner wall, and enabling a user to move one or more of the control points.

In an embodiment, the method comprises enabling a user to edit the inner artery wall data by facilitating selection of vessel stenosis, and modifying the inner artery wall data based on the selected stenosis. A plurality of selectable stenosis ranges may be provided.

In an embodiment, the method comprises enabling a user to edit the inner artery wall data by facilitating selection of a stenosis level for a vessel segment and/or specific location within the vessel.

In an embodiment, the method comprises enabling a user to edit the inner artery wall data by facilitating selection of a stenosis level for an individual lesion.

In an embodiment, the modifying the inner artery wall data based on the selected stenosis by carrying out an iterative process including the steps of modifying the lumen area of a selected slice and subsequently recalculating vessel stenosis.

In an embodiment, if the stenosis level is proposed to be reduced, the step of modifying the lumen area of a selected slice comprises reducing the stenosis level of each slice that exceeds a maximum level associated with the selected stenosis level by increasing the lumen area of the slice.

In an embodiment, if the stenosis level is proposed to be increased, the step of modifying the lumen area of a selected slice comprises identifying a slice with maximum stenosis and increasing the stenosis level of the slice to be above the minimum level associated with the selected stenosis level by reducing the lumen area of the slice.

In an embodiment, the iterative process comprises 3 iterations.

In an embodiment, if the stenosis level of a vessel segment is determined to be 0%, the system may be arranged to apply a disease machine learning component to the vessel segment in order to identify potentially stenotic lesions, the disease machine learning component trained to recognise disease in coronary vessels.

In accordance with a second aspect of the present invention, there is provided a system for identifying coronary artery disease comprising:
  receiving contrast cardiac CT data indicative of a contrast cardiac CT scan carried out on a patient;
  a vessel seed detector that analyses received contrast cardiac CT data indicative of a contrast cardiac CT scan carried out on a patient using machine learning to identify a plurality of centreline seed points in the contrast cardiac CT data predicted to correspond to locations in cardiac arteries of the patient by:
    analysing the contrast cardiac CT data using machine learning to identify a plurality of predicted centreline seed points; and
    determining a plurality of centreline seed points corresponding to predicted locations on centrelines of the coronary arteries using machine learning by predicting from an instant determined centreline seed point a probable direction to a further centreline seed point of the coronary artery, and selecting a predicted centreline seed point from the plurality of predicted centreline seed points using the predicted probable direction to a further centreline seed point of the coronary artery;

a vessel wall segmenter that produces data indicative of transverse image slices of the cardiac arteries of the patient using the contrast cardiac CT data and the identified centreline seed points, the vessel wall segmenter analysing the transverse image slice data using machine learning to produce inner artery wall data and outer artery wall data indicative of predicted respective inner and outer walls of the coronary arteries of the patient; and a disease assessment unit that identifies presence of coronary artery disease using the predicted inner and/or outer walls of the coronary arteries of the patient.

BRIEF DESCRIPTION OF THE DRAWINGS

The present invention will now be described, by way of example only, with reference to the accompanying drawings, in which:

FIG. 3 is a schematic block diagram of a vessel seed detector of the coronary artery disease analysis device shown in FIG. 2;

FIG. 4 is a schematic block diagram of a centreline tracker of the coronary artery disease analysis device shown in FIG. 2;

FIG. 5 is a schematic block diagram of a vessel wall segmenter of the coronary artery disease analysis device shown in FIG. 2;

FIGS. 6A, 6B and 6C show example cross sectional representations of portions of a cardiac artery imaged using a CTCA scan;

FIG. 7 is a schematic block diagram of a stenosis assessment component of a disease assessment unit of the coronary artery disease analysis device shown in FIG. 2;

DESCRIPTION OF AN EMBODIMENT OF THE INVENTION

The present disclosure relates to a system for and method of identifying coronary artery disease and in the described examples the system and method also quantifies and characterises identified coronary artery disease (CAD). The disclosed system and method use coronary computed tomography angiography (CCTA) data, and in the described examples the system and method automatically identify, quantify and characterise coronary artery disease by detecting and tracking coronary artery centrelines, estimating the location of inner and outer walls of coronary arteries, and determining the extent and characteristics of any identified disease using the estimated inner and outer walls together with an analysis of the composition and spatial characteristics of identified gaps between the inner and outer walls.

The described system and method are able to detect the presence and severity of arterial narrowing (referred to as stenosis), and identify early stages of coronary artery disease by identifying high risk plaques including spotty calcification, low attenuation plaques and positive remodelling of the vessel walls. The output from the system may be in the form of a report highlighting key findings and priority risks.

Figure 1:
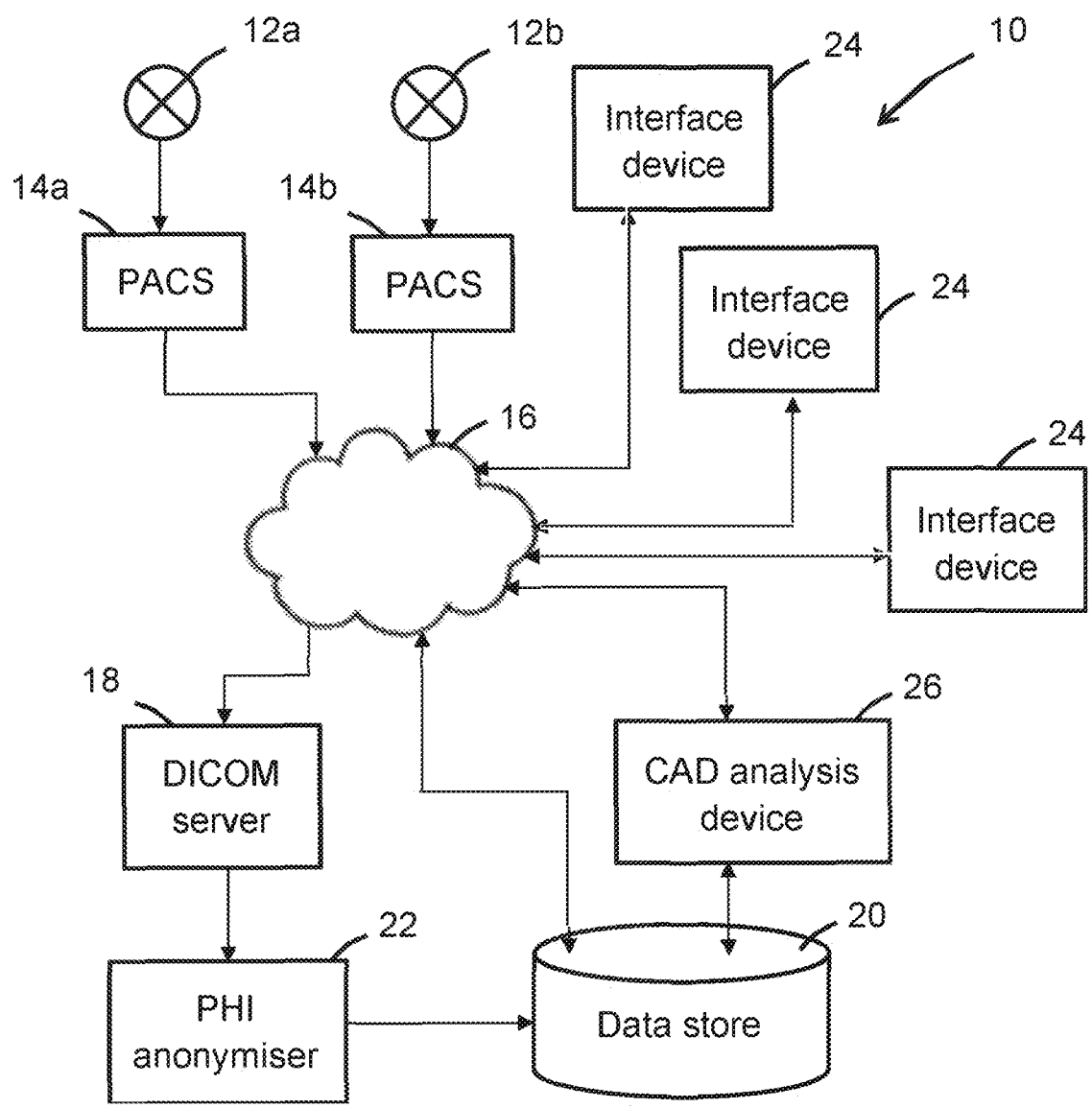
FIG. 1 is a schematic block diagram of a system for identifying, and in this example characterising, coronary artery disease according to an embodiment of the present invention.

Referring to the drawings, FIG. 1 shows a schematic block diagram of a system 10 for identifying and characterising coronary artery disease.

In this example, the system 10 is arranged to interact with multiple providers of cardiac computed tomography angiography (CCTA) data, represented in FIG. 1 by CCTA scanning devices 12a, 12b and associated Picture Archiving and Communication Systems (PACS) 14a, 14b. Each PACS system 14a, 14b is arranged to manage capture and storage of medical image data produced by a CCTA scanning device 12a, 12b, and communication of the medical image data to a medical image data server 18, in this example disposed remotely of the CCTA service providers, and accessible through a wide area network such as the Internet 16. In this example, the medical image data server 18 is a Digital Imaging and Communications in Medicine (DICOM) server, although it will be understood that any suitable device for receiving and managing storage of received CCTA image data is envisaged.

The DICOM server 18 is arranged to store received CCTA image data in a data storage device 20 that may include one or more databases. In this example, the system 10 also includes a personal health information (PHI) anonymiser 22 that may be a separate component or a component incorporated into the DICOM server 18. The PHI anonymiser 22 is arranged to encrypt patient specific meta data (typically including name, date of birth and a unique ID number) in the received CCTA image data before the CCTA image data is stored in the data storage device 20. In this way, the patient specific meta data is still associated with the CCTA image data, but is only accessible by authorised people, for example using login and password data.

The system 10 is arranged to enable multiple authorised users to interact with the system 10, for example by providing each authorised user with an interface device 24. Each interface device 24 may include any suitable computing device, such as a personal computer, laptop computer, tablet computer or mobile computing device.

The system 10 also includes a coronary artery disease (CAD) analysis device 26 in communication with the data storage device 20 and arranged to analyse CCTA image data stored in the data storage device 20 to identify, quantify and characterise coronary artery disease in the CCTA image data, and produce reports indicative of the analysis.

The system 10 may be arranged to store different resolution versions of received CCTA data and/or facilitate conversion of received CCTA data to lower resolutions so that CAD analysis can be carried out on a selected resolution version. In this way, a user is able to modify CAD analysis depending on desired accuracy and analysis speed.

The system 10 may be arranged to facilitate access using the interface device 24 in any suitable way. For example, the system 10 may be configured such that the CAD analysis device 26 is accessible through a web browser on the interface device 24, wherein all or most processing activity occurs remotely of the interface device 24, or the system 10 may be configured such that at least some processing activity occurs at the interface device 24, for example by providing the interface device 24 with at least one software application that implements at least some processing activity on the CCTA data stored at the data storage device 20.

In an alternative example, instead of providing a distributed system wherein CCTA data received from patients is stored remotely at a network accessible location, one or more components of the system 10 may be disposed at the same location as the interface device 24 and/or the CT device 12a, 12b such that most or all processing activity and/or storage of the CCTA data occurs at the same location.

As indicated in FIG. 1, in this example the data stored at the data storage device 20 may also be accessible by the interface device 24 directly, for example so that a user at the interface device 24 can view raw CCTA data.

Using the interface device 24, a user is able to instigate analysis and/or view the results of analysis of CCTA data stored at the data storage device 20. During analysis, the CAD analysis device 26 extracts relevant CCTA data from the data storage device 20 and carries out analysis processes on the CCTA data in order to identify, quantify and characterise coronary artery disease present in the CCTA image data, and produce relevant reports.

Figure 2:
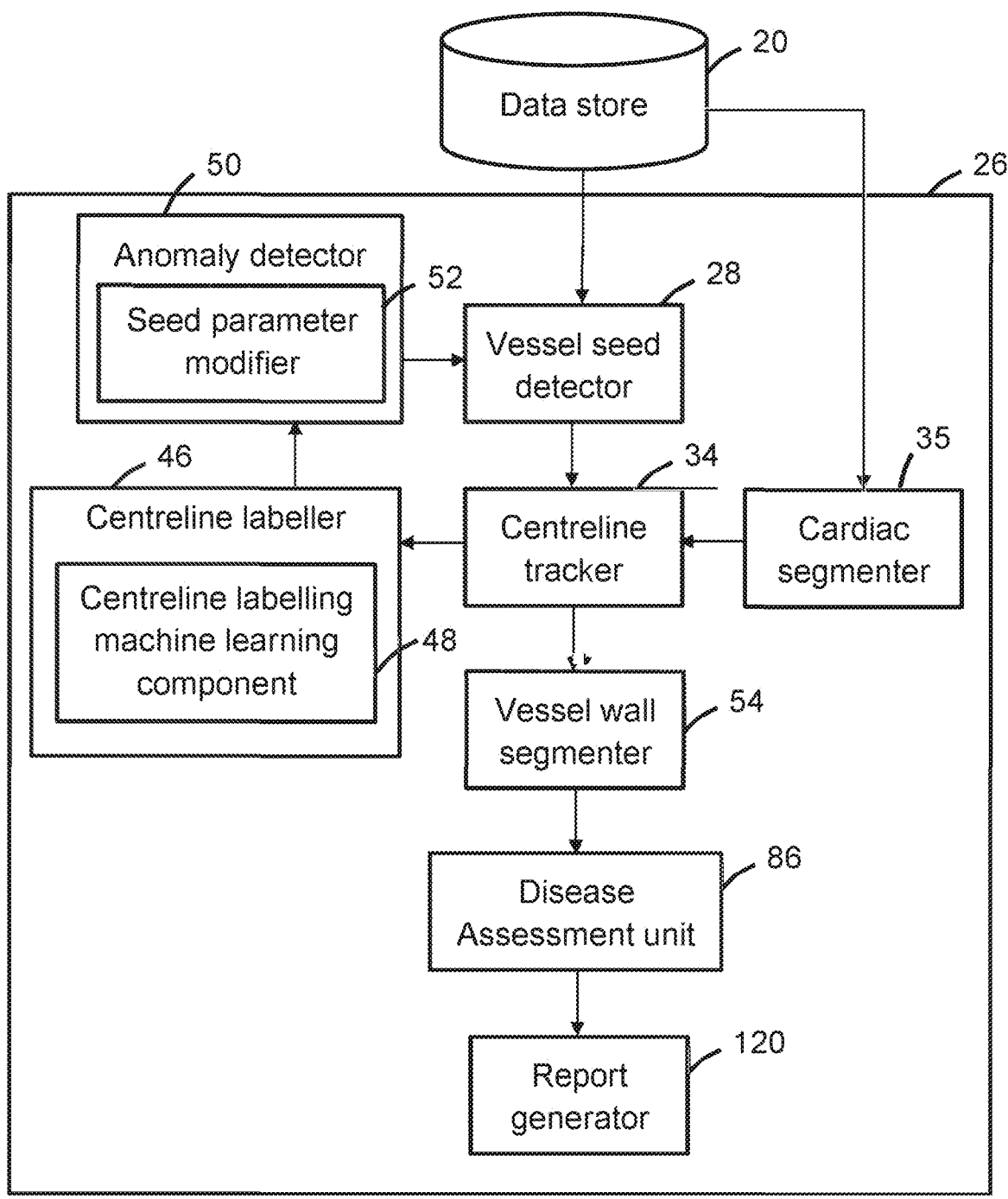
FIG. 2 is a schematic block diagram of a coronary artery disease analysis device of the system shown in FIG. 1.

The CAD analysis device 26 is shown in more detail in FIG. 2, which is a schematic block diagram illustrating functional components of the CAD analysis device 26.

The CAD analysis device 26 relies primarily on segmentation of inner and outer walls of the coronary arteries and the information produced by this is used to detect and assess the disease burden in the scan. In order to accurately segment the vessel walls, it is first necessary to identify representative lines, in this example centrelines, of the vessels, and this is achieved by identifying a plurality of seed points for each centreline corresponding to voxels within the CT volume that are likely to be located on a centreline of a coronary artery. To facilitate this process, a contrast agent is injected into the blood stream to increase contrast and in this example increase a Hounsfield Unit (HU) value of the coronary arteries compared to the surrounding tissue.

The CAD analysis device 26 identifies vessel seed points using a vessel seed detector 28 that in this example uses multiscale filtering and supervised machine learning to detect seed points from training data. Functional components of the vessel seed detector 28 are shown in FIG. 3.

The vessel seed detector 28 includes a vessel seed machine learning component 30, in this example a volumetric convolutional neural network (CNN) that is trained using ground truth data indicative of a sufficient number of example coronary artery centrelines.

It should be understood that many points in the CT volume have a non-zero probability of being suitable as a vessel seed point. With this in mind, the vessel seed detector 28 includes a candidate seed point determiner 32 that identifies a set of predicted seed points present in a sample of CCTA data using the vessel seed machine learning component 30, then selects candidate seed points from the set of predicted seed points that are to form the basis of centreline tracking and thereby prediction of the centrelines of the coronary arteries. The candidate vessel seed points are determined from the set of seed points based on one or more defined constraints, such as seed points that have a radiodensity value, such as a Hounsfield Unit (HU) value, above a defined amount, or a defined number of seed points above a defined HU threshold, such as a defined number of seed points that have the highest HU values. In one example, the candidate vessel seed points that have a HU value between 100 and 600 are selected as candidate seed points.

The vessel seed machine learning component 30 is trained using reference vessel seed points representing points that are considered by an expert to lie on coronary artery centrelines.

The CAD analysis device 26 tracks coronary artery centrelines using a centreline tracker 34. Functional components of the centreline tracker 34 are shown in FIG. 4.

In this example, the centreline tracker 34 includes a centreline tracking machine learning component 36. The centreline tracker 34 considers the determined candidate seed points and a centreline direction predictor 38 uses the centreline tracking machine learning component 36 to predict from an instant seed point the most probable direction to the next seed point on the coronary artery in three dimensional space. In this way, vessel centreline seed points are identified that are likely to lie on the currently considered coronary artery. In this example, the centreline tracking process starts at a predicted seed point located at an endmost location on an artery centreline.

In this example, the centreline tracking machine learning component 36 is arranged to use data cubes and the candidate seed points to predict the most probable direction to the next centreline seed point, and based on this to select a centreline seed point from the candidate seed points. The seed points identified in this way as located on a coronary artery centreline are connected together using a seed point connector 40 so as to define a complete coronary artery.

An important part of centreline tracking is to detect the intersection locations between the coronary arteries and the aorta, referred to as the coronary ostia. The present system and method is arranged to detect the aorta intersection locations using an aorta intersection determiner 42 that uses information indicative of the location of the ascending aorta with tracking information defined by the determined centrelines, and determines whether a coronary artery connects to the aorta based on whether the coronary artery extends to a position within a defined distance, such as 4 mm, from the wall of the aorta. If so, the path of the coronary artery is projected to extend to an intersection point with the aorta and is anatomically connected. In the present example, the location of the ascending aorta is determined using a cardiac segmenter 35 by carrying out an aorta segmentation process on the CCTA data, the aorta segmentation process for example using a convolutional neural network, that may be a Unet or Vnet neural network, for example trained using ascending aorta ground truth data.

The centreline tracker 34 is arranged to detect the four main coronary arteries first—the Left Main (LM), Left Anterior Descending (LAD), Left Circumflex (LCX) and the Right Coronary Artery (RCA)—then after the main coronary arteries have been detected, an artery branch detector 44 detects branches on the primary coronary arteries that were not initially identified as viable centrelines. The main coronary arteries are easier to track than the branches as they carry more blood and therefore more contrast agent. Tracking smaller branches becomes increasingly difficult as the branches reduce in diameter and therefore carry less blood and less contrast agent. The branch detector 44 uses a branch detection algorithm.

The branch detector 44 examines the HU values perpendicular to the centreline direction of a vessel, and estimates the approximate radius of the vessel by finding the boundary of the coronary artery based on the HU value, since the HU value decreases significantly outside of the vessel wall. Once the boundary has been located on each side of the centreline, the vessel's diameter can be measured.

Branches are detected based on the rate of change in measured diameter of the vessel along the length of a centreline. For example, if the measured diameter of the vessel increases by more than 10% along the centreline, then decreases back to its original size it is marked as a detected branch, noting that coronary vessels naturally decrease in size from a proximal to a distal location. At the coronary ostia, vessels may have a diameter of about 4 mm, whilst at a distal location the vessel diameter typically reduces to less than 1 mm. The branch detector 44 therefore examines the rate of change of the estimated diameter to detect points along the centreline from which another coronary artery is branching.

As shown in FIG. 2, the CAD analysis device 26 also includes a centreline labeller 46 arranged to attach semantically meaningful labels to the tracked artery centrelines so that clinicians can identify the vessels. The identification process uses a centreline labelling machine learning component 48, that in this example comprises a supervised classifier, to label the coronary artery centrelines on the identified structured coronary tree. Ground truth centrelines annotated with appropriate labels are used to train the classifier. A number of different classification processes may be used and in this example the classifier includes an adaptive boosting (AdaBoost) algorithm to boost performance of the classifier. In this example, the key features used by the classification process to label each coronary artery are the end location of the artery centreline remote from the aorta, and the mean direction vectors of the centreline at 3 different centreline locations—at a proximal location (adjacent the aorta), at a location at mid vessel, and at a distal location of the artery (a location at or adjacent an end of the artery remote from the aorta).

As shown in FIG. 2, the CAD analysis device 26 also includes an anomaly detector 50 arranged to improve the reliability of the centreline tracking process by reconfiguring the vessel seed detector 28 if the analysis carried out by the centreline tracker 34 is incorrect or incomplete, for example because the vessel seed detector 28 has generated too many or insufficient seed points. After the detected coronary arteries have been labelled by the centreline labeller 46, a seed parameter modifier 52 of the anomaly detector 50 communicates with the vessel seed detector 28 to reconfigure the parameters of the vessel seed detector 28 if a determination is made that the identified vessels are incorrect or incomplete, for example if the initial vessel seed detector configuration failed to detect a major coronary artery, such as the RCA. In this example, the seed parameter modifier 52 may communicate with the vessel seed detector 28 to lower the constraint applied by the vessel seed detector 28 so that more candidate vessel seed points are produced, thereby increasing the probability of detecting the vessel in a subsequent iteration. In an example, this may be achieved by widening an applied Hounsfield Unit (HU) test from 100-600 to 50-600. A similar approach may be used to reduce the number of candidate vessel seed points if too many seed points are produced.

It will be understood that the anomaly detector 50 functions as a feedback loop to modify the parameters of the vessel seed detector 28 until an appropriate set of candidate vessel seed points are produced to detect all coronary arteries or at least a defined subset of the coronary arteries such as all of the main coronary arteries (LM, LAD, LCX, RCA).

Failure to detect a coronary artery may occur due to various factors. For example, the concentration of contrast dye provided to a patient may have reduced to the extent that the number of seed points passing the applied HU test has become too low.

In the above example, the feedback look operates automatically. However, it will be understood that manual modification of vessel tracking parameters, such as a location threshold parameter that indicates what is considered to be a valid location for a coronary artery, or the parameters of the vessel seed detector 28, may be carried out in response to observed results. For example, if the results do not successfully identify all of the main coronary arteries, a user may modify a valid location parameter and/or a tracking parameter in order to increase the likelihood of more successfully identifying the main coronary arteries. In this way, the vessel tracking process is more robust because the parameters of the process are changed based on observed results, and the system is more likely to be able to deal with CCTA data that has different dynamic ranges.

After all desired coronary arteries have been satisfactorily tracked and labelled, a vessel wall segmenter 54 shown in FIG. 2 uses the tracked centrelines to analyse the CCTA data associated with the coronary arteries, in particular to carry out an inner and outer vessel wall segmentation process.

The functional components of the vessel wall segmenter 54 are shown in FIG. 5. The vessel wall segmenter 54 uses a wall segmenter machine learning component 56 to produce inner and outer wall lumen masks that can then be used to identify coronary artery disease associated with the presence of calcified and non-calcified plaques and taking into account imaging artifacts.

In this example, the wall segmenter machine learning component 56 is a supervised volumetric convolutional neural network (CNN) that is trained using ground truth training data indicative of a sufficient number of example transverse coronary artery image slices, in this example image slices that are perpendicular to and intersecting with the artery centrelines. The training data in this example includes inner and outer artery walls and relevant imaging artefacts that have been annotated by medical experts, and covers a wide range of examples of different coronary vessels with varying degrees of disease and including various typical imaging artifacts indicative of abnormalities, such as vessel bulging.

In this example, in order to provide a richer data set, the wall segmenter machine learning component 56 is trained for points along a vessel centreline by providing multiple cross sectional image data slices, including at least one image data slice before each defined centreline point and at least one image data slice after each defined centreline point. Since disease manifests itself over multiple cross sectional slices, providing the CNN with multiple slices in this way allows the CNN to incorporate a spatial context to more accurately reflect the characteristics of the disease. However, it will be understood that other implementations are envisaged, such as one image data slice for each defined centreline point. Long-axis image data may also be used for training purposes to provide the CNN with additional context for the semantic segmentation process. Additionally, it will be understood that data augmentation can be used to ensure that the inner and outer wall segmentation process generalises effectively from the training data to unseen cases.

During analysis of received CCTA data, the vessel wall segmenter 54 uses a slice analyser 58 to sample slices of the CCTA data, in this example perpendicular to the determined centrelines. The vessel wall segmenter 54 uses the wall segmenter machine learning component 56 to predict whether each voxel in each obtained image slice is likely to be part of an inner wall or an outer wall of a coronary artery. The voxels identified as being part of the inner and outer artery walls of a coronary artery in the sample slices are then connected together using a connected component analyser 60 that uses a technique to identify neighbouring voxels that belong to the inner wall or the outer wall of the vessel and thereby produce inner and outer artery wall segmentations.

Example representations of portions of a cardiac artery imaged using a CT scan after wall segmentation are shown in FIGS. 6A to 6C. FIG. 6A shows a 'long-axis' view 62 of a portion of an artery that includes coronary artery disease 63, in this example the view 62 reprojected so as to appear linear for ease of reference. FIGS. 6B and 6C show transverse cross-sectional views 66, 76—'short-axis' views—of the cardiac artery portion shown in FIG. 6A at different locations along the coronary artery. FIG. 6B represents a cross sectional view taken along a first transverse plane 68 shown in FIG. 6A. FIG. 6C represents a cross sectional view taken along a second transverse plane 78 shown in FIG. 6A.

In the sample slice shown in FIG. 6B, an inner wall 70 and an outer wall 72 have been identified by the vessel wall segmenter 54, and it can be seen that at the location indicated by the first transverse plane 68, the artery shown does not appear to be affected by disease and the vessel lumen 74 appears to be unobscured.

In the sample slice shown in FIG. 6C, an inner wall 80 and an outer wall 82 have been identified by the vessel wall segmenter 54, and it can be seen that at the location indicated by the second transverse plane 78, the artery shown is affected by disease 63 and the vessel lumen 74 partially obscured.

It will be understood that after completion of coronary artery wall segmentation, the system has sufficient data to define the inner and outer vessel wall configurations of the detected coronary arteries. Using this data, it is possible to determine the presence of disease by analysing voxels associated with gap regions between the inner and outer vessel walls.

For this purpose, as shown in FIG. 2, the CAD analysis device 26 includes a disease assessment unit 86. Functional components of the disease assessment unit 86 are shown in FIGS. 7 and 8.

In this example, the CAD analysis device 26 is arranged to assess different types of disease including arterial constriction, referred to as 'stenosis', and presence of high-risk plaques, including calcified, mixed or non-calcified plaques, using heuristics based on the spatial characteristics and Hounsfield Unit values of gaps in the vessel walls.

Figure 8:
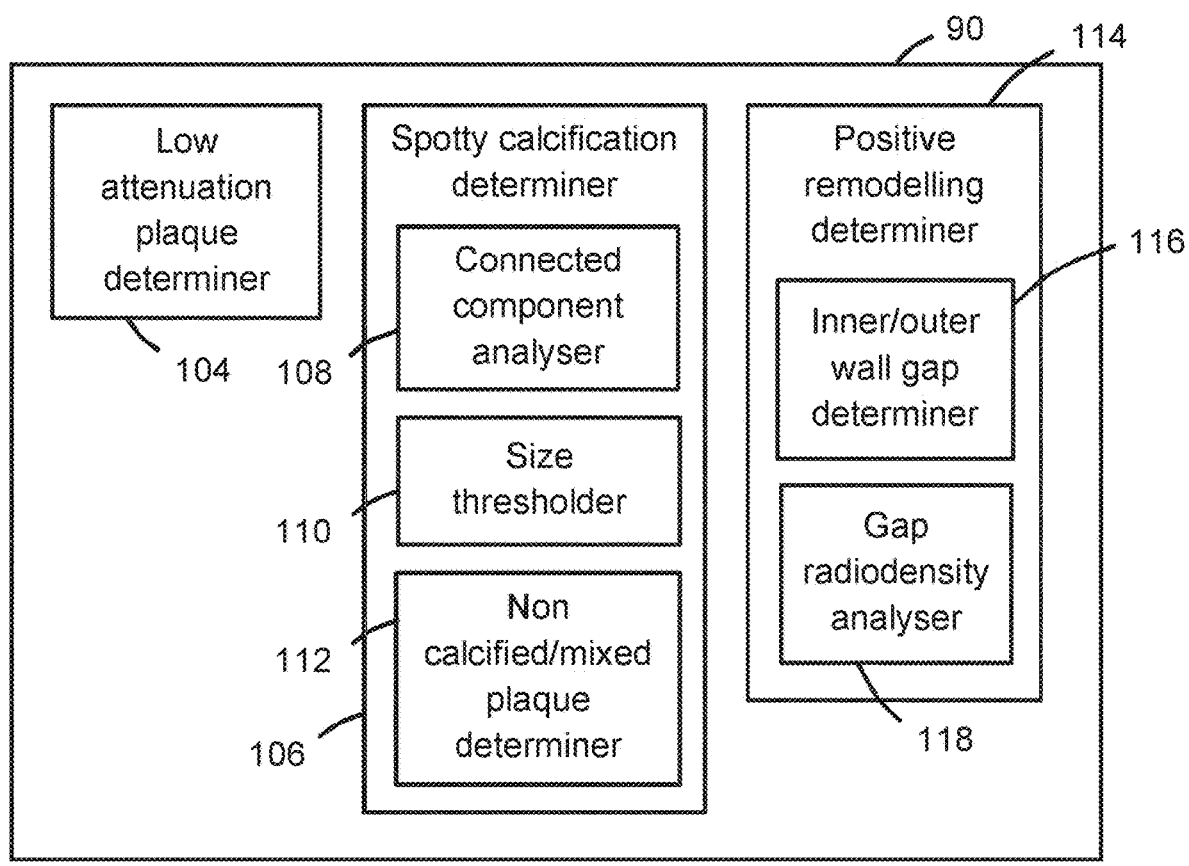
FIG. 8 is a high risk plaque assessment component of the disease assessment unit of the coronary artery disease analysis device shown in FIG. 2.

FIG. 7 illustrates functional components 88 of a stenosis detection and analysis component of the disease assessment unit 86, and FIG. 8 illustrates functional components 90 of high risk plaque detection and analysis component of the disease assessment unit 86.

The stenosis functional components 88 include a lumen area determiner 92 arranged to use the inner and outer wall segmentation data to determine the cross-sectional area defined by the inner wall. The vessel lumen cross-sectional area is used to determine and characterise a stenosis condition with reference to a healthy state condition.

It is understood that after bifurcation of an artery, it is common for a relatively narrow portion of the artery to exist that could produce a stenosis false positive. In order to avoid this, the stenosis functional components 88 include a post branch reference area determiner 96 that removes arterial regions immediately after each bifurcation and instead uses a calculated reference area for the region following the bifurcation. The reference area is calculated using a linear regression analyser 98 by fitting a linear regression line to the area along the length of the lumen section after the bifurcation. This process results in a piecewise linear structure with discontinuities at detected bifurcation points. Since coronary vessels naturally reduce in diameter as they wrap around the myocardium (heart), the piecewise linear structure essentially sets the expected or mean progressively reducing area of each healthy (non-stenotic) vessel. A defined proportional reduction compared to the expected reference area indicates that the vessel has contracted from a normal healthy state, and therefore stenosis is present. It will be understood that the stenosis assessment component may also provide determinations in relation to arteries that have expanded from a normal healthy state.

In this example, the stenosis functional components 88 also include a post processor 100 arranged to carry out additional processing on the inner and outer wall segmentation data, for example to carry out a smoothing operation on the data to reduce noise reduction due to localised variations in the lumen area not associated with disease.

In clinical reporting, stenosis is typically graded in quantitative percentage grades such as 25-49%. A stenosis category determiner 102 is arranged to use the stenosis analysis to produce a percentage stenosis grade and a categorical value for reporting.

The high risk plaque functional components 90 are shown in FIG. 8. High risk plaques (HRP) are also referred to as vulnerable plaques and are an early indication of coronary artery disease for a patient. The disease assessment unit 86 detects several forms of HRP using heuristic, rule based analysis of the artery wall segmentation, in this example low attenuation plaque, spotty calcification and positive remodelling. For this purpose, the high risk plaque functional components 90 include a low attenuation plaque determiner 104, a spotty calcification determiner 106 and a positive remodelling determiner 114.

Low attenuation plaques are characterised by Hounsfield Unit (HU) values in the range −30 to 30 Hounsfield units, and therefore may be directly detected through analysis and thresholding of Hounsfield units.

A spotty calcification is defined as a relatively small calcification surrounded by non-calcified or mixed plaque. To detect spotty calcification, the spotty calcification determiner 106 initially determines voxels that are predicted to be associated with calcified plaques in the determined disease region between the inner and outer artery wall, for example by filtering using a defined radiodensity measure, such as a Hounsfield Unit (HU) value greater than 350. A connected component analyser 108 is then used to associate related voxels together as calcified volumes. Spotty calcifications are characterised as being smaller than 3 mm in diameter, and accordingly a size thresholder 110 is used to detect these. A non-calcified/mixed plaque determiner 112 is also used to provide additional heuristics to determine whether the voxels surrounding the identified spotty calcifications have HU values consistent with non-calcified or mixed plaques.

Positive remodelling is characterised by an expansion of the outer vessel wall to compensate for the disease build up between the inner and outer wall. The positive remodelling determiner 114 is arranged to detect this using an inner/outer wall gap determiner that determines whether the gap between the inner and outer artery wall has increased beyond a defined amount, for example 10% beyond a normal vessel gap. The positive remodelling determiner 114 also includes a gap radiodensity analyser 118, in this example arranged to determine whether the voxels in the gap are consistent with non-calcified plaque, for example by determining the HU values of the voxels in the gap.

The determinations made by the disease assessment unit 86 form the basis of a report produced by a report generator 120.

Figure 9:
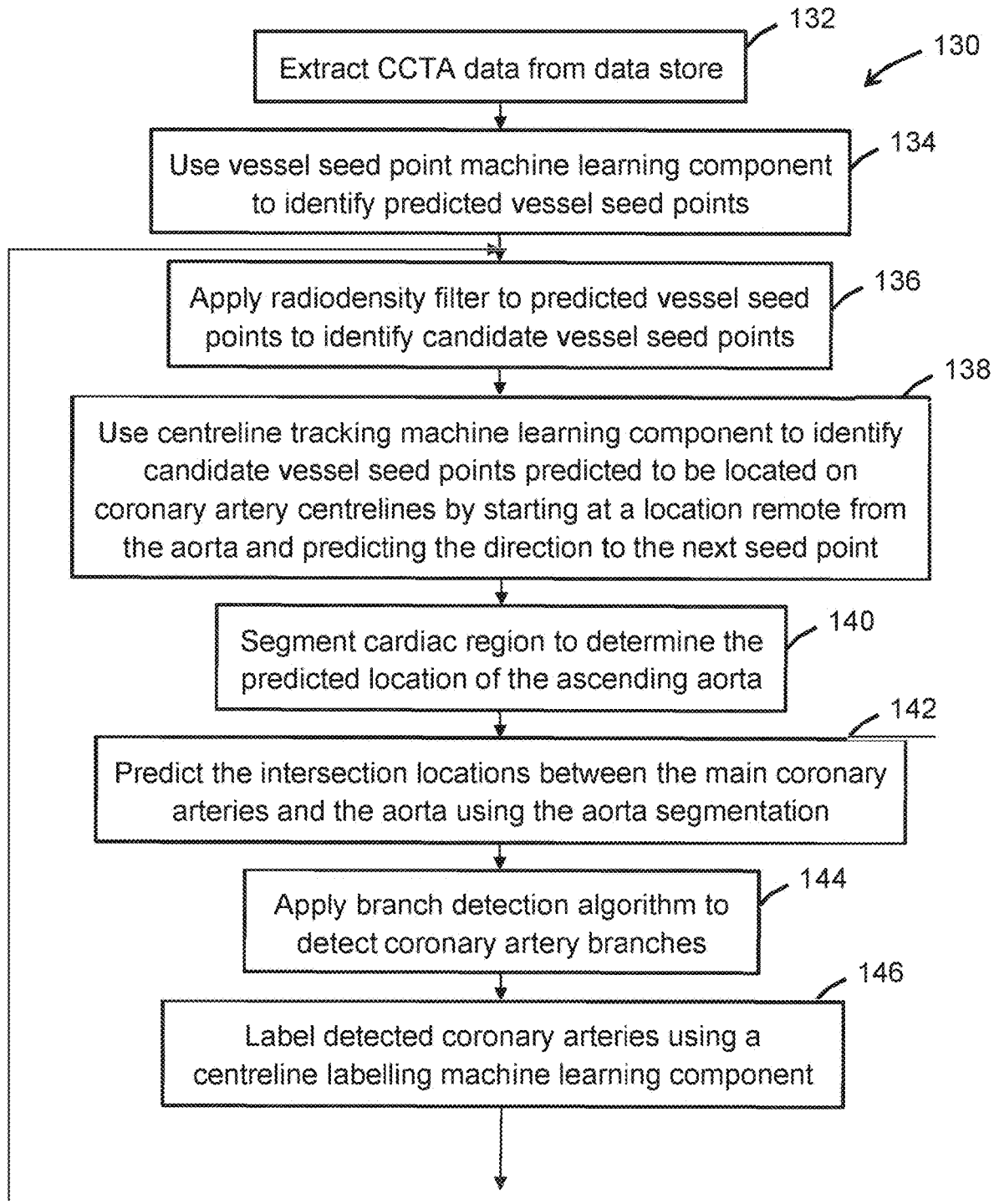
FIG. 9 is a flow diagram illustrating a method of identifying, and in this example characterising, coronary artery disease according to an embodiment of the present invention.

Referring to FIG. 9, a flow diagram 130 is shown that illustrates an example method of identifying, and in this example characterising, coronary artery disease using the system shown in FIG. 1.

The method comprises extracting CCTA data from the data store 20, using the vessel seed point machine learning component 30 to identify predicted vessel seed points, and applying a radiodensity filter to the predicted vessel seed points to identify candidate vessel seed points, as indicated at steps 132, 134 and 136. The centreline tracking machine learning component 36 is then used to identify candidate vessel seed points predicted to be located on coronary artery centrelines by starting at a location remote from the aorta and predicting the direction to the next seed point, as indicated at step 138.

As indicated at steps 140 and 142, a cardiac region in the CCTA data is then segmented to determine the predicted location of the ascending aorta, and the intersection locations between the main coronary arteries and the aorta are predicted using the aorta segmentation. A branch detection algorithm is then applied to detect coronary artery branches, as indicated at step 144.

The detected coronary arteries are labelled using a centreline labelling machine learning component, as indicated at step 146.

As indicated at steps 148 and 150, if the coronary arteries have not been sufficiently detected, the radiodensity filter parameters used by the vessel seed detector 28 are modified as required, and the vessel seed detection and centreline tracking processes indicated by steps 136 to 146 are reimplemented. This process repeats until the coronary arteries have been sufficiently detected.

As indicated at steps 152 and 154, the CCTA data is sampled to produce image slice data, each image slice intersecting with a detected centreline and extending transversely across a coronary artery, and the wall segmenter machine learning component 56 is used to produce inner wall and outer wall lumen data based on the sampled image slices.

The inner wall data is used to determine the cross-sectional area defined by the inner wall and the determined area used to identify and characterise stenosis, and determined gaps between the inner and outer walls is used to determine presence of and characterise high-risk plaques or positive remodelling, as indicated at steps 156 and 158.

As indicated at steps 160 and 162, representations of coronary artery cross-sections are displayed using the inner and outer wall data and the analysis of the gaps between the inner and outer walls, and a report indicative of presence of stenosis and/or high-risk plaques in the CCTA data may be generated.

The system 10 may be arranged to enable a user to edit the displayed inner and optionally outer vessel walls and associated inner and outer wall data, for example because a clinician believes that the stenosis assessment provided by the system 10 is incorrect. In one arrangement, this may be achieved by manually modifying the relevant wall(s) using a suitable interface screen.

Figure 10:
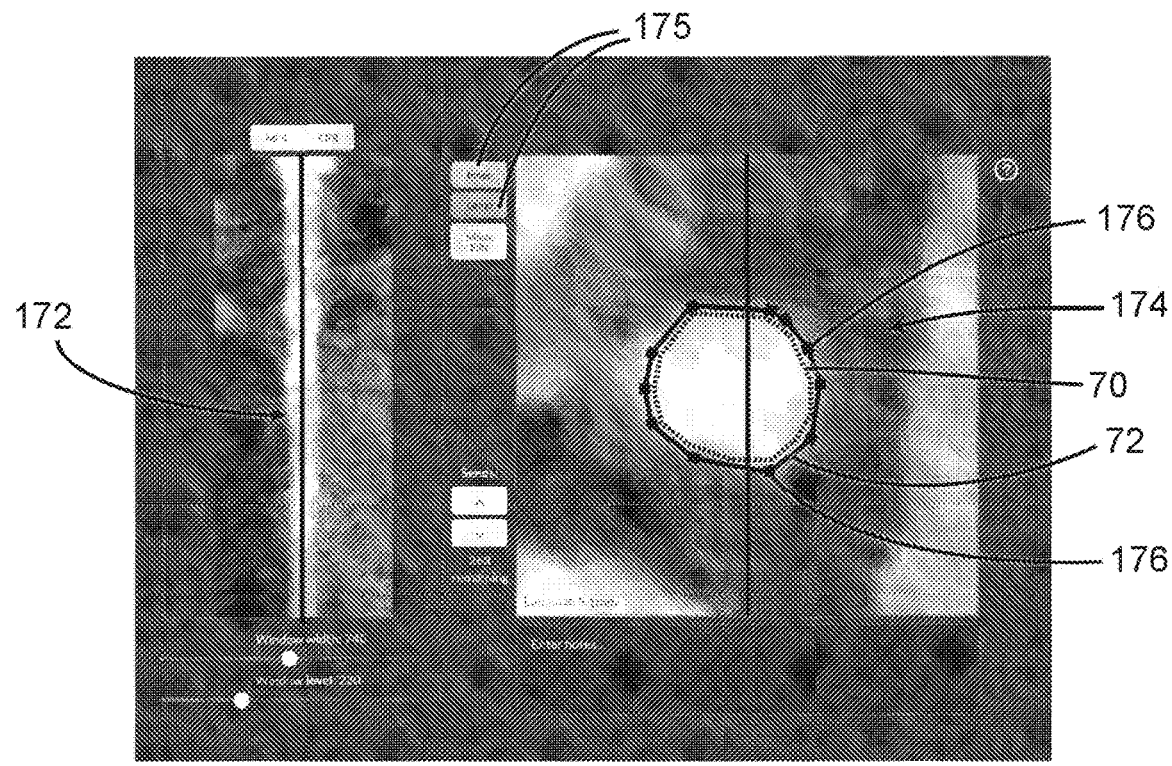
FIG. 10 is a representation of a vessel wall editing screen of a system for identifying, and in this example characterising, coronary artery disease according to an embodiment of the present invention.

For example, as shown in FIG. 10, a vessel wall editing screen 170 may be used. The screen 170 includes a long axis cross sectional view 172 of a coronary artery, and a transverse cross sectional view 174 of the coronary artery that shows inner 70 and outer 72 walls of the vessel. Using wall selection buttons 175, a user is able to select the inner 70 or outer 72 wall, which causes control points 176 to be displayed that are representative of the shape of the selected wall. The user is able to change the shape of the selected wall by selecting and moving one or more of the control points 176, for example using a mouse.

While the inner and optionally outer walls 70, 72 of a vessel may be modified using the vessel wall editing screen 170, the process is relatively cumbersome since the user must manually move each relevant control point 176 until the desired stenosis level is obtained for the displayed vessel.

Figure 11:
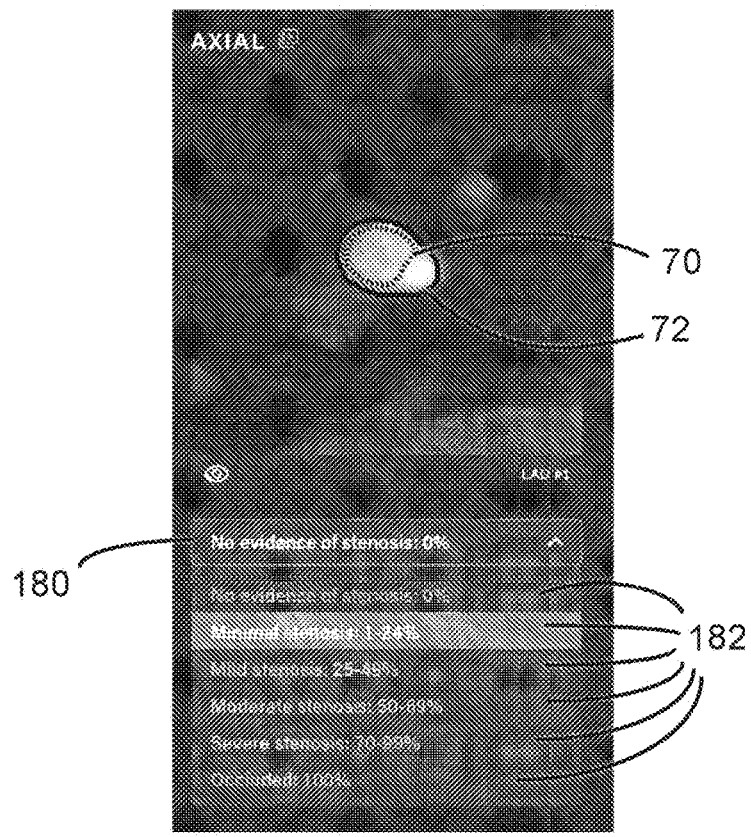
FIG. 11 is a representation of an alternative vessel wall editing screen of a system for identifying, and in this example characterising, coronary artery disease according to an embodiment of the present invention.

An alternative vessel wall editing screen 178 is shown in FIG. 11. With this arrangement, instead of manually amending the vessel wall by individually moving control points, the alternative vessel wall editing screen 178 includes a stenosis level drop down box 180 that enables a user to select the appropriate stenosis range 182 for the displayed vessel or for an individual selected lesion. In response to selection of a new stenosis range 182, the system 10 modifies the displayed vessel inner wall 70 to match the selected stenosis range 182.

Figure 12:
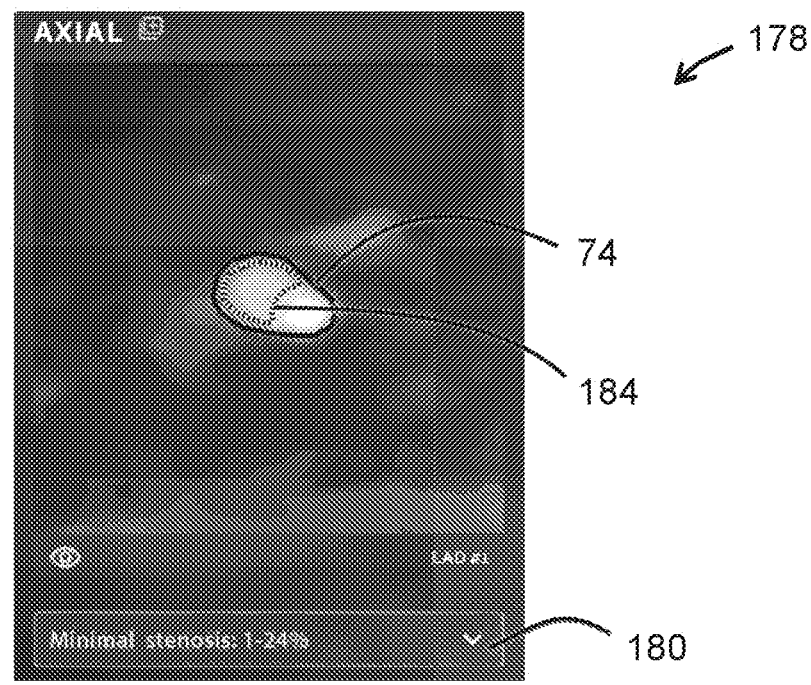
FIG. 12 is a representation of the alternative vessel wall editing screen shown in FIG. 11 after selection of a new stenosis level.

As shown in FIG. 11, the displayed vessel has a determined stenosis level of 0%, but a user has selected a new stenosis level 1%-24% because the user believes that 1%-24% is a more appropriate stenosis level for the vessel. In response, as shown in FIG. 12, a revised inner wall 184 is displayed that increases a gap between the new inner wall 184 and the outer wall 72, thereby indicating an increased level of stenosis.

In this way, in order to modify a displayed vessel, a user need only select the appropriate stenosis range 182 for the displayed vessel or selected lesion and in response the system will modify the inner wall of the displayed vessel or lesion to a configuration that satisfies the selected stenosis range.

It will be understood that the configuration of the inner wall 184 of the displayed vessel that satisfies the selected stenosis level may be determined in any suitable way, for example using ground truth training data associated with diseased vessels of varying degrees.

The vessel wall editing screen 178 may be used to modify the stenosis level assigned to a vessel segment or to modify the stenosis level assigned to individual lesions.

Figure 13:
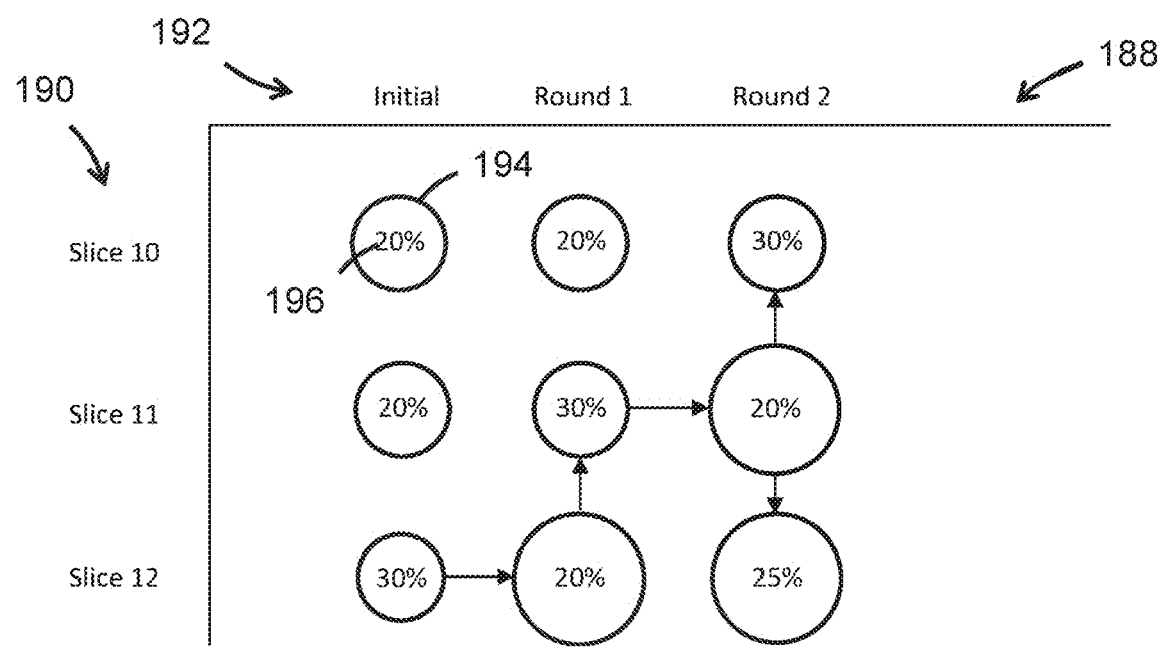
FIG. 13 is a diagrammatic representation of an iterative process implemented by the system after selection of the new stenosis level.
Figure 14:
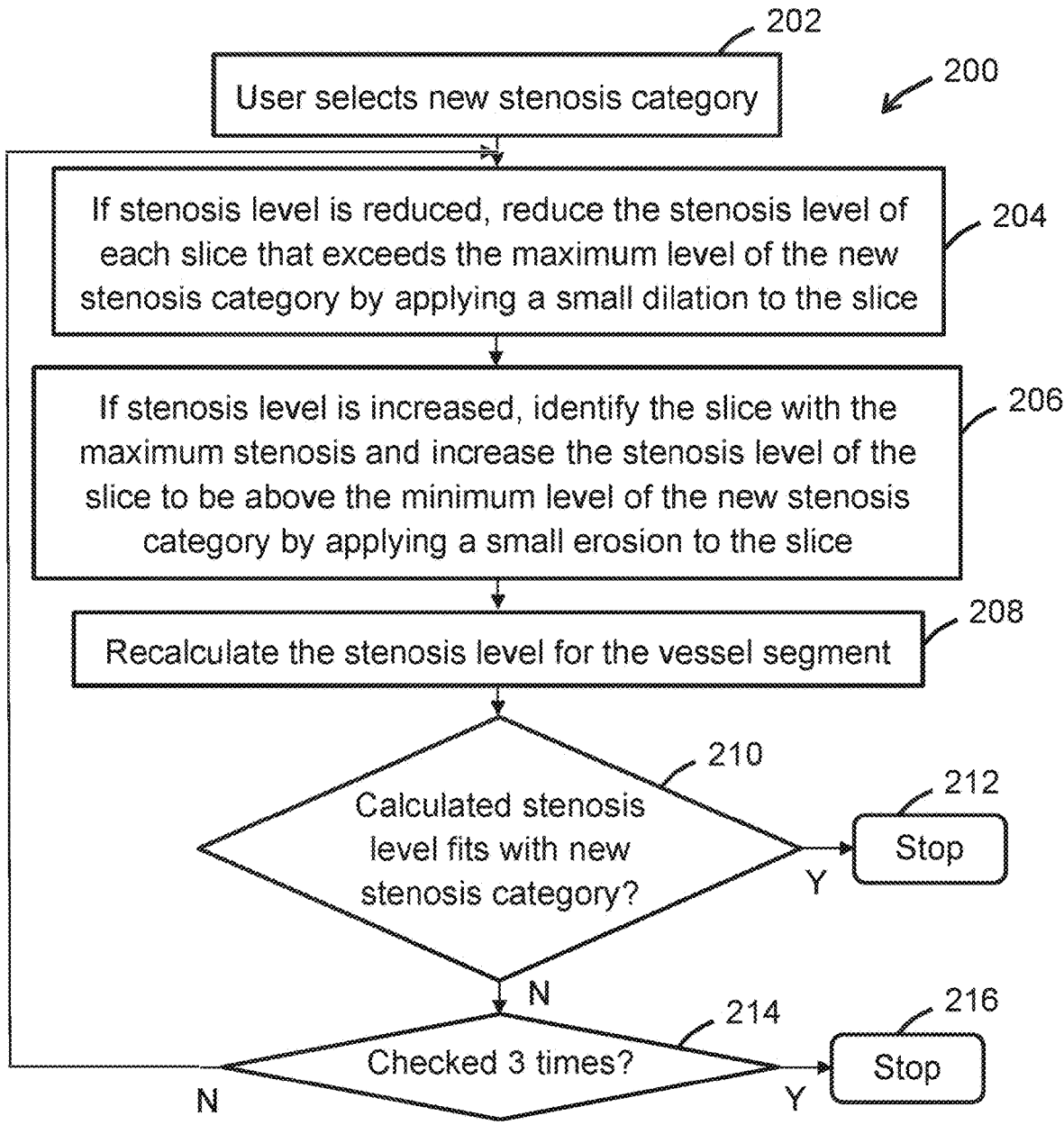
FIG. 14 is a flow diagram illustrating steps of a method of amending a vessel wall.

In an example wherein the stenosis level assigned to a vessel segment is desired to be modified, the system 10 may apply the methodology illustrated in iterative process diagram 188 shown in FIG. 13 and flow diagram 200 shown in FIG. 14 that illustrates steps 202 to 214 of a method of amending a vessel wall.

In an example, a user desires to modify the determined stenosis level of a coronary artery vessel segment from a current level 25%-49% to a new level 1%-24% because the user believes that this is the appropriate stenosis level for the vessel segment. As indicated at step 202, the user selects the new stenosis range 182 using the stenosis level drop down box 180.

If the stenosis level is proposed to be reduced, the method involves reducing the stenosis level of each slice that exceeds the maximum level of the new stenosis category by applying a small dilation to the slice, as indicated at step 204.

If stenosis level is proposed to be increased, the method involves identifying the slice with the maximum stenosis and increasing the stenosis level of the slice to be above the minimum level of the new stenosis category by applying a small erosion to the slice, as indicated at step 206.

In the present example, since the stenosis level is proposed to be reduced, the stenosis level of each slice that exceeds the maximum level of the new stenosis range is reduced by applying a small dilation to the vessel inner wall associated with the slice.

Vessel slices are shown diagrammatically in FIG. 13 wherein 3 example slices 190 are shown at initial and 2 subsequent rounds of the iterative process. For each slice, the size of the vessel inner wall is represented by the size of a circle 194 and the level of stenosis at the slice is represented by the percentage value 196 in the circle. As shown, before modification of the stenosis level, the 10th and 11th slices are within the proposed new stenosis range, but the 12th slice is at 30% stenosis, which is above the proposed range. Consequently, as indicated at step 204, in order to reduce the level of stenosis at the 12th slice, the lumen area is increased slightly. The stenosis of the vessel segment is then recalculated taking into account modified slice lumen areas, as indicated at step 208.

The lumen area may be increased or decreased in any suitable way. For example, the lumen area may be increased by dilating the inner wall using morphological operators.

Alternatively, the vessel wall segmenter 54 may include an alternate machine wall segmenter machine learning component 56 that is trained to produce lumen masks indicative of an increased level of stenosis, and a further alternate machine wall segmenter machine learning component 56 that is trained to produce lumen masks indicative of a reduced level of stenosis. With this arrangement, a default model may be used and the alternate or further alternate machine learning component selected depending on whether stenosis is desired to be increased or decreased.

In a further alternate arrangement, image processing techniques may be used to modify the lumen area, such as region growing and/or other segmentation techniques based on the HU value in the vessel.

As shown in FIG. 13, at round 1 of the iterative process, after recalculation of stenosis, the stenosis level of the 12th slice has reduced to 20% because of the increase in lumen area. However, increasing the lumen area at the 12th slice has caused the stenosis recalculation step 208 to increase the stenosis level at the adjacent 11th slice to 30% because the lumen area of slice 11 is now proportionally smaller relative to the 12th slice. At a subsequent iteration (round 2), since the stenosis of the 11th slice is now above the proposed range, a small dilation is applied to the lumen area of the 11th slice to reduce the stenosis level, and the stenosis of the vessel segment is again recalculated taking into account the modified slice lumen areas, as indicated at step 208. This causes the stenosis level of the 11th slice to reduce to 20%, but increasing the lumen area of the 11th slice has caused the stenosis recalculation step 208 to increase to 30% at adjacent slice 10 because the lumen area of slice 10 is now proportionally smaller relative to the 11th slice. Similarly, the stenosis level of the 12th slice also increases because the lumen area of the 12th slice is now proportionally smaller relative to the 11th slice.

It is expected that after 3 iterations, the stenosis level of all slices will be within the selected proposed stenosis range 182.

In some situations, it is not possible to use vessel or vessel segment-based modification of stenosis range using the above methodology. For example, in a situation wherein one or more lesion of the vessel or segment is within the range 90%-100%, it is not possible to increase the stenosis level at other lesions of the vessel or segment by increasing the vessel/segment stenosis range because the stenosis range for the vessel/segment is already at the maximum level available. In this situation, the user may modify the inner wall of one or more lesions individually.

In a further situation, a clinician may wish to increase the stenosis level for a vessel or vessel segment but since the vessel/segment is determined by the system to be at 0% stenosis it is difficult to determine which slices of the vessel/segment should be increased.

In this circumstance, a disease machine learning component may be used that is specifically trained to recognise disease in the vessels, the disease machine learning component being applied to the vessel/segment determined to be at 0% in order to identify potentially stenotic lesions. After identifying potentially stenotic lesions, the above methodology may be used to increase the stenosis range applicable to the vessel, vessel segment or individual lesion(s). The disease machine learning component may be any suitable machine learning component, such as a U-Net trained neural network.

In an alternative arrangement for increasing the level of stenosis when the vessel/segment has been determined to be at 0% stenosis, the above wall segmentation process is discarded and a fresh wall segmentation process is implemented using a machine learning component, such as a U-Net, that has been trained with ground truth vessel slice images and expert annotated stenosis values. After identifying potentially stenotic lesions, the above methodology may be used to increase the stenosis range applicable to the vessel, vessel segment or individual lesion(s).

In the claims that follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

Modifications and variations as would be apparent to a skilled addressee are deemed to be within the scope of the present invention.

We claim:
1. A method of identifying coronary artery disease comprising:
    receiving contrast cardiac CT data indicative of a contrast cardiac CT scan carried out on a patient;
    analysing the contrast cardiac CT data using machine learning to identify a plurality of centreline seed points in the contrast cardiac CT data predicted to correspond to locations on centrelines of the cardiac arteries of the patient by:
- analysing the contrast cardiac CT data using machine learning to identify a plurality of predicted centreline seed points; and
- determining a plurality of centreline seed points corresponding to predicted locations on centrelines of the coronary arteries using machine learning by predicting from an instant determined centreline seed point a probable direction to a further centreline seed point of the coronary artery, and selecting a predicted centreline seed point from the plurality of predicted centreline seed points using the predicted probable direction to a further centreline seed point of the coronary artery;

producing data indicative of transverse image slices of the cardiac arteries of the patient using the contrast cardiac CT data and the identified centreline seed points;

analysing the transverse image slice data using machine learning to produce inner artery wall data and outer artery wall data indicative of predicted respective inner and outer walls of the coronary arteries of the patient; and identifying presence of coronary artery disease using the predicted inner and/or outer walls of the coronary arteries of the patient.

2. A method as claimed in claim 1, wherein the step of identifying a plurality of predicted centreline seed points comprises applying a radiodensity test so as to pass predicted centreline seed points that have an associated radiodensity value within a defined parameter range.

3. A method as claimed in claim 1, wherein the step of predicting a probable direction to a further centreline seed point is carried out using the predicted centreline seed points and data cubes.

4. A method as claimed in claim 1, comprising using machine learning to detect intersection locations between coronary arteries and the aorta.

5. A method as claimed in claim 4, comprising determining whether a coronary artery connects to the aorta based on whether the coronary artery extends to a position within a defined distance from the ascending aorta.

6. A method as claimed in claim 2, comprising modifying the parameter range used by the radiodensity test if a determination is made that the identified coronary arteries are incorrect or incomplete.

7. A method as claimed in claim 1, comprising using the determined inner wall data to determine a cross-sectional lumen area, and using the determined cross-sectional lumen area to identify stenosis.

8. A method as claimed in claim 7, comprising determining a reference cross sectional area after each artery bifurcation, the reference area calculated by fitting a linear regression line to an artery portion after the artery bifurcation, the linear regression line indicative of a linear progressively reducing reference cross sectional area, and identifying stenosis based on a comparison of a determined cross-sectional area with a reference cross sectional area according to the linear regression line.

9. A method as claimed in claim 1, comprising enabling a user to edit the inner artery wall data.

10. A method as claimed in claim 9, comprising enabling a user to edit the inner artery wall data by facilitating selection of vessel stenosis, the system modifying the inner artery wall data based on the selected stenosis.

11. A method as claimed in claim 10, comprising modifying the inner artery wall data based on the selected stenosis by carrying out an iterative process including the steps of modifying the lumen area of a selected slice and subsequently recalculating vessel stenosis.

12. A system for identifying coronary artery disease comprising:
- receiving contrast cardiac CT data indicative of a contrast cardiac CT scan carried out on a patient;
- a vessel seed detector that analyses received contrast cardiac CT data indicative of a contrast cardiac CT scan carried out on a patient using machine learning to identify a plurality of centreline seed points in the contrast cardiac CT data predicted to correspond to locations in cardiac arteries of the patient by:
  - analysing the contrast cardiac CT data using machine learning to identify a plurality of predicted centreline seed points; and
  - determining a plurality of centreline seed points corresponding to predicted locations on centrelines of the coronary arteries using machine learning by predicting from an instant determined centreline seed point a probable direction to a further centreline seed point of the coronary artery, and selecting a predicted centreline seed point from the plurality of predicted centreline seed points using the predicted probable direction to a further centreline seed point of the coronary artery;
- a vessel wall segmenter that produces data indicative of transverse image slices of the cardiac arteries of the patient using the contrast cardiac CT data and the identified centreline seed points, the vessel wall segmenter analysing the transverse image slice data using machine learning to produce inner artery wall data and outer artery wall data indicative of predicted respective inner and outer walls of the coronary arteries of the patient; and
- a disease assessment unit that identifies presence of coronary artery disease using the predicted inner and/or outer walls of the coronary arteries of the patient.

13. A system as claimed in claim 12, wherein the vessel seed detector is arranged to apply a radiodensity test so as to pass predicted centreline seed points that have an associated radiodensity value within a defined parameter range.

14. A system as claimed in claim 12, wherein the vessel tracker is arranged to predict a probable direction to a further centreline seed point using the predicted centreline seed points and data cubes.

15. A system as claimed in claim 12, wherein the vessel tracker is arranged to use machine learning to detect intersection locations between coronary arteries and the aorta.

16. A system as claimed in claim 15, wherein the vessel tracker is arranged to determine whether a coronary artery connects to the aorta based on whether the coronary artery extends to a position within a defined distance from the ascending aorta.

17. A system as claimed in claim 13, wherein the vessel seed detector is arranged to modify the parameter range used by the radiodensity test if a determination is made that the identified coronary arteries are incorrect or incomplete.

18. A system as claimed in claim 12, wherein the disease assessment unit is arranged to use the determined inner wall data to determine a cross-sectional lumen area, and using the determined cross-sectional lumen area to identify stenosis.

19. A system as claimed in claim 12, wherein the system is arranged to enable a user to edit the inner artery wall data.

20. A system as claimed in claim 12, wherein the system is arranged to enable a user to edit the inner artery wall data by facilitating selection of vessel stenosis, the system modifying the inner artery wall data based on the selected stenosis.

21. A system as claimed in claim 20, wherein the system is arranged to modify the inner artery wall data based on the selected stenosis by carrying out an iterative process including the steps of modifying the lumen area of a selected slice and subsequently recalculating vessel stenosis.

\* \* \* \* \*